United States Patent
Ohashi (10) Patent No.: US 10,006,562 B2
(45) Date of Patent: Jun. 26, 2018

(54) REGULATING VALVE WITH ELASTIC MODULUS PLANETARY GEAR TRANSMISSION

(71) Applicant: Azbil Corporation, Tokyo (JP)

(72) Inventor: Tomofumi Ohashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days. days.

(21) Appl. No.: 15/298,794

(22) Filed: Oct. 20, 2016

(65) Prior Publication Data

US 2017/0114925 A1    Apr. 27, 2017

(30) Foreign Application Priority Data

Oct. 23, 2015 (JP) ................................. 2015-208848

(51) Int. Cl.
*F16K 31/53* (2006.01)
*F16H 1/28* (2006.01)
*F16K 31/04* (2006.01)

(52) U.S. Cl.
CPC ............. *F16K 31/535* (2013.01); *F16H 1/28* (2013.01); *F16K 31/045* (2013.01)

(58) Field of Classification Search
CPC .......... F16K 31/53; F16K 31/535; F16H 1/28; F16H 1/2809; F16H 1/2863; F16H 1/131;
(Continued)

(56) References Cited

U.S. PATENT DOCUMENTS 3,381,548 A * 5/1968 Wolkenstein ......... F16H 1/2809
29/428

3,633,441 A * 1/1972 Hicks .................... F16H 1/2809
475/334
(Continued)

FOREIGN PATENT DOCUMENTS

JP    2004-232834 A    8/2004
JP    2007-177405 A    7/2007
(Continued)

OTHER PUBLICATIONS

Korean Intellectual Property Office, "Office Action," issued in KR Patent Application No. KR 10-2016-0137754, which is Korean counterpart of U.S. Appl. No. 15/298,794, dated Apr. 2, 2018, 9 pages (5 pages of English Translation of Korean Office Action, 4 pages of Original Korean Office Action).

*Primary Examiner* — Matthew W Jellett
(74) *Attorney, Agent, or Firm* — Amster, Rothstein & Ebenstein LLP (57) ABSTRACT

A setting/operating device includes: a drive motor, a sun gear that rotates by force from the drive motor; a fixed internal gear; planetary gears configured to be rotatable in engagement with the fixed internal gear while revolving around the sun gear; a movable internal gear disposed coaxially with the fixed internal gear and provided so as to be rotatable in engagement with the planetary gears; an output shaft coupled to the movable internal gear and configured to rotate a valve stem of a regulating valve; wherein the planetary gear includes: a first gear portion configured to engage the sun gear and the fixed internal gear, a second gear portion disposed coaxially with the first gear portion and configured to engage the movable internal gear; and an elastically deformable portion having a smaller elastic modulus formed integrally between the first gear portion and the second gear portion.

3 Claims, 6 Drawing Sheets

(58) Field of Classification Search
CPC .......... F16H 13/12; F16H 13/14; F16H 25/12; F16H 2057/126
USPC .............................................. 251/248, 250.5
See application file for complete search history.

(56) References Cited

U.S. PATENT DOCUMENTS

| | | | | |
|---|---|---|---|---|
| 7,815,542 | B2 * | 10/2010 | Dec ........................... | F16H 3/60 192/69.91 |
| 8,397,757 | B2 * | 3/2013 | Kannoo ................ | F16K 11/074 137/625.43 |
| 8,584,359 | B1 * | 11/2013 | Bowman .................. | F16H 1/46 29/893.1 |

FOREIGN PATENT DOCUMENTS

| | | |
|---|---|---|
| JP | 2010-255833 A | 11/2010 |
| JP | 2011-231842 A | 11/2011 |
| JP | 2014-016222 A | 1/2014 |
| KR | 20-0450505 Y1 | 10/2010 |

\* cited by examiner

Fig. 11

REGULATING VALVE WITH ELASTIC MODULUS PLANETARY GEAR TRANSMISSION

CROSS-REFERENCE TO RELATED APPLICATION

The present application claims the benefit of and priority to Japanese Patent Application No. 2015-208848, filed on Oct. 23, 2015, the entire contents of which are incorporated by reference herein.

TECHNICAL FIELD

The present disclosure relates to a setting/operating device for operating a valve stem of a regulating valve and relates, for example, to a setting/operating device for operating a valve stem of a rotary-type regulating valve.

BACKGROUND

In the related art, in a chemical plant or the like, a regulating valve is used for process control of a flow rate. A valve opening of the regulating valve is adjusted by a setting/operating device (hereinafter, also referred to as an "actuator") that operates a valve stem of the regulating valve based on a control signal from a positioner.

In general, in a rotary-type regulating valve, such as a butterfly valve, a valve member of the regulating valve may be opened and closed by a force of a fluid that is under control. For example, in a case of an electric actuator, when an electric supply to the actuator is stopped due to an interruption of electric service, or the like, within a plant, a retaining force for a drive motor in an interior of the actuator is lost and an opening degree of the regulating valve may not be maintained.

Therefore, a power transmitting mechanism that drives the valve stem of the actuator requires a self-lock function that prevents the valve stem from operating even when no electric power is supplied. As the power transmitting mechanism that realizes the self-lock function, as disclosed in PTL 1 described below for example, a paradox planetary gear mechanism is well known.

PTL 2 discloses a setting/operating device in which the planetary gear mechanism is employed as a power transmitting mechanism for a valve stem.

CITATION LIST

Patent Literature

[PTL 1] JP-A-2007-177405
[PTL 2] JP-A-2014-16222
[PTL 3] JP-A-2010-255833

SUMMARY

The present inventor has studied about an employment of the paradox planetary gear mechanism in the power transmitting mechanism in an actuator for realizing an electric actuator which achieves lower cost and compact profile. As a result of the study, the following problems are revealed.

In the case where the paradox planetary gear mechanism is applied as a power transmitting mechanism for a valve stem in an electric actuator, even when a force is applied to the valve stem of a regulating valve by a force of a fluid that is controlled by the regulating valve, the valve stem is fixed by a self-lock function of the paradox planetary gear mechanism, so that a valve member is prevented from opening and closing.

However, if an excessive torque increase occurs abruptly due to foreign substances, or the like, caught by the regulating valve while the regulating valve is being driven, for example, a movable internal gear and a planetary gear, which constitute the paradox planetary gear mechanism, are subjected to an impact force caused by a torque increase, which may lead to damage to the teeth of the gears.

As one measure for solving the above-described problems, for example, the disclosure in the above-described PTL 2 may be employed. In the electric actuator in which the planetary gear mechanism disclosed in PTL 2 is employed, a coil spring is provided as an elastic member between an outer peripheral surface of an internal gear of the planetary gear mechanism and an inner peripheral surface of a case, and a rotation of the internal gear is restricted until a torque of a predetermined value or higher is applied by the coil spring to a carrier that holds the planetary gear.

However, with the technology disclosed in PTL 2, the fixed internal gear cannot be commonly used with the case, the plate, and the like and, in addition, the elastic member is also required. Therefore, an increase in number of components may result.

In view of such problems described above, it is an object of the invention to provide a setting/operating device including a paradox planetary gear mechanism in which damage to the gears is reduced while restricting an increase in the number of components.

Means for Solving the Problem

A setting/operating device (100) for operating a valve stem of a regulating valve according to the invention includes: a sun gear (3) that rotates upon reception of a rotational force from a drive motor (2); a fixed internal gear (5) fixedly disposed in a form of surrounding the sun gear and having teeth on an inner peripheral surface thereof; a plurality of planetary gears (4_1 to 4_3) disposed between the sun gear and the fixed internal gear and rotated in engagement with the sun gear and the fixed internal gear while revolving around the sun gear; a movable internal gear (6) disposed coaxially with the fixed internal gear, having teeth that come into engagement with the planetary gear on the inner peripheral surface thereof, and provided so as to be rotatable; an output shaft (7) coupled to the movable internal gear and configured to rotate the valve stem of the regulating valve; wherein the planetary gear includes: a first gear portion (41) configured to engage the sun gear and the fixed internal gear, a second gear portion (42) disposed coaxially with the first gear portion and configured to engage a manual operating gear (9) and the movable internal gear; and elastically deformable portions (43, 44, 45) formed integrally with the first gear portion and the second gear portion and having an elastic modulus smaller than those of the first gear portion and the second gear portion.

In the setting/operating device, the elastically deformable portion (43) may be a groove (430) formed on an outer peripheral portion of the planetary gear between the first gear portion and the second gear portion in a radial direction of the planetary gear.

In the setting/operating device described above, the elastically deformable portion (44) may have a tooth thickness smaller than the first gear portion and the second gear portion of the planetary gear.

In the setting/operating device described above, the elastically deformable portion (45) may be formed of a material having an elastic modulus smaller than those of the first gear portion and the second gear portion.

In the description described above, as an example, reference numerals in drawings corresponding to components of the invention are designated in parentheses.

Advantage of the Invention

According to the description given above, the invention realizes a setting/operating device having a paradox planetary gear mechanism in which damage to the gears is reduced.

DETAILED DESCRIPTION

Hereinafter, embodiments of the invention will be described with reference to the drawings.
<<Embodiment 1>>

Figure 1:
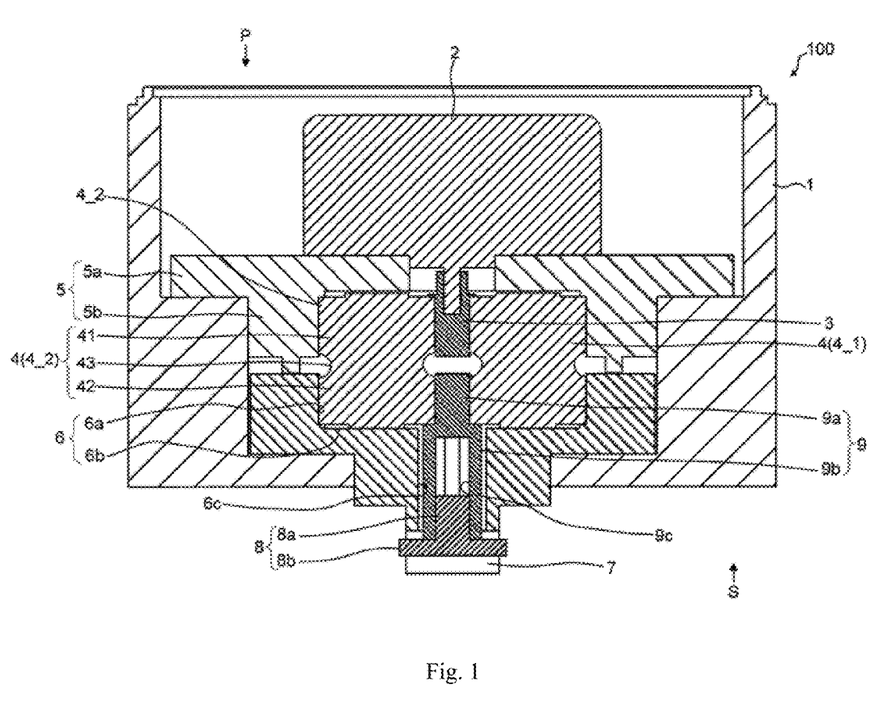
FIG. 1 is a cross-sectional view illustrating a principal portion of a setting/operating device according to Embodiment 1.

FIG. 1 is a cross-sectional view illustrating a principal portion of a setting/operating device according to Embodiment 1.

Figure 2:
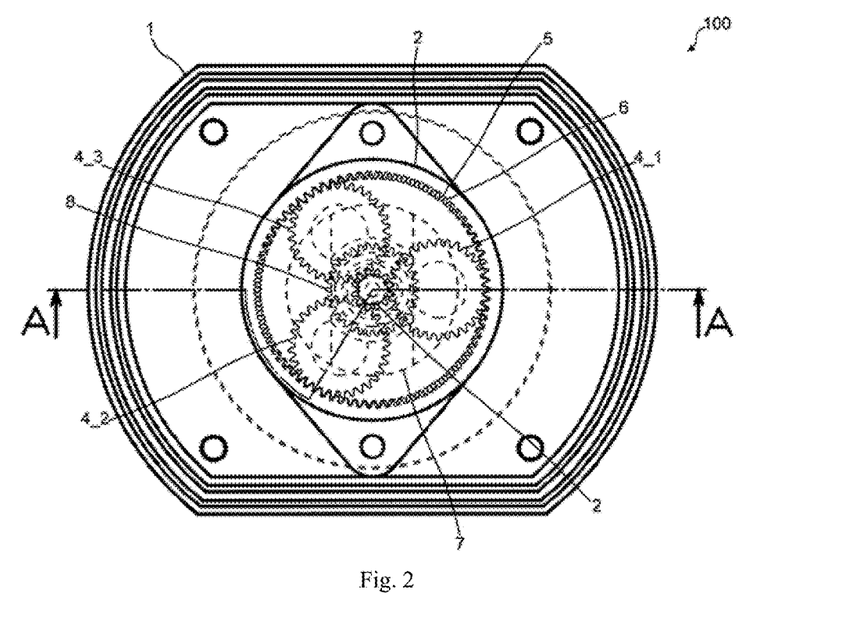
FIG. 2 is a plan view illustrating a principal portion of the setting/operating device according to Embodiment 1.

FIG. 2 is a plan view illustrating a principal portion of the setting/operating device according to Embodiment 1.

FIG. 2 illustrates a planar structure of a principal portion of a setting/operating device 100 when viewed from a direction P in FIG. 1, and FIG. 1 illustrates a cross section of the setting/operating device 100 taken along the line A-A in FIG. 2. In FIGS. 1 and 2, part of the components of the setting/operating device 100 is omitted in order to clarify positional relationship among the gears which constitute a power transmitting mechanism of the setting/operating device 100.

The setting/operating device 100 according to Embodiment 1 illustrated in FIG. 1 is a device configured to operate a regulating valve used in process control of a flow rate in a plant or the like, and is configured to control a valve opening of the regulating valve by operating a valve stem of the regulating valve in accordance with an operation signal supplied from a positioner provided externally. For example, the setting/operating device 100 is an electric actuator configured to operate a rotary-type regulating valve such as a butterfly valve.

The setting/operating device 100 according to Embodiment 1 includes a paradox planetary gear mechanism as a power transmitting mechanism that operates the valve stem of the regulating valve, and includes a self-lock function which prevents the valve stem from operating even when no electric power is supplied to the electric motor. The setting/operating device 100 has a function that allows a manual operation of the valve stem to fix the valve stem at a given valve opening by manually operating the valve stem even when no power is supplied to the electric motor.

In addition, the setting/operating device 100 includes a structure for preventing the gears of the paradox planetary gear mechanism from becoming damaged by absorbing a force applied from the regulating valve (valve stem) side.

A specific structure for realizing the above-described functions in the setting/operating device 100 will be described in detail below.

As illustrated in FIGS. 1 and 2, the setting/operating device 100 includes a housing 1, a drive motor 2, a sun gear 3, planetary gears 4_1 to 4_3, a fixed internal gear 5, a movable internal gear 6, an output shaft 7, a dial 8, and a manual operating gear 9.

Although the setting/operating device 100 also includes an electronic circuit unit and a power supply unit for controlling the rotation of the drive motor 2 based on an operation signal supplied from a positioner, illustration of these components is omitted in FIGS. 1 and 2.

The housing 1 is a container for accommodating the components of the setting/operating device 100 and is formed of, for example, a metallic material.

The drive motor 2 is an electric motor that is controlled by the electronic circuit unit (not illustrated) described above.

The sun gear 3 is a gear that is coupled to the rotation shaft of the drive motor 2 and is a gear that rotates (rotates about its own axis) upon reception of a rotational force of the rotation shaft.

The fixed internal gear 5 is a gear that is fixedly disposed in a form of surrounding the sun gear 3 and has teeth on an inner peripheral surface thereof (which may be annular teeth or teeth on an annular surface to form an annular gear, annular gear surface, or annular gear portion). Specifically, the fixed internal gear 5 includes a plate 5a configured to support the drive motor 2 and rotatably hold the planetary gear 4 in the direction P, and a gear portion 5b that engages the periphery of a first gear portion 41.

Although the plate 5a and the gear portion 5b may be separate components, a reduction in number of components is achieved by forming these members integrally.

The planetary gears 4_1 to 4_3 (referred to as "planetary gear 4" when they are collectively expressed) are gears which are disposed between the sun gear 3 and the fixed internal gear 5, and rotate in engagement with the sun gear 3 and the fixed internal gear 5 while revolving around the sun gear 3. Specifically, the planetary gears 4_1 to 4_3 each include a first gear portion 41, a second gear portion 42, and an elastically deformable portion 43.

The first gear portion 41 is a gear configured to engage the sun gear 3 and the fixed internal gear 5. The second gear portion 42 is a gear that is disposed coaxially with the first gear portion 41 and is configured to engage the manual operating gear 9 and the movable internal gear 6. The number of teeth of the first gear portion 41 is the same as that of the second gear portion 42.

The elastically deformable portion 43 is disposed between the first gear portion 41 and the second gear portion 42 and formed integrally with the first gear portion 41 and the second gear portion 42 and has an elastic modulus smaller than those of the first gear portion 41 and the second gear portion 42. Details of the elastically deformable portion 43 will be described later.

The movable internal gear 6 is disposed coaxially with the fixed internal gear 5, has teeth that come into engagement with the planetary gear 4 (second gear portion 42) on the inner peripheral surface thereof (which may be annular teeth or teeth on an annular surface to form an annular gear, annular gear surface, or annular gear portion), and is provided so as to be rotatable. As illustrated in FIG. 1, the movable internal gear 6 includes a gear portion 6a that engages the second gear portion 42 and a bottom portion 6b that rotatably supports the planetary gear 4. The bottom portion 6b includes a through-hole 6c that is formed in a direction of an axis of rotation (which may also be referred to as an "axial direction") of the movable internal gear 6.

An output shaft 7 is a component that is coupled to the movable internal gear 6 and is configured to rotate the valve stem of the regulating valve. As illustrated in FIGS. 1 and 2, the output shaft 7 has the same axis of rotation as the movable internal gear 6 and is formed integrally with the movable internal gear 6.

The dial 8 is a component that serves as manually operating means configured to apply a force that is applied externally to the sun gear 3 or the planetary gear 4 as a rotational force. The manual operating gear 9 is a gear that is coupled to the dial 8 and is configured to transmit a force applied thereto via the dial 8 to the planetary gear 4. Detailed description of the manual operating gear 9 and the dial 8 will be described later.

The sun gear 3, the planetary gear 4, the fixed internal gear 5, and the movable internal gear 6 are formed of, for example, a resin material such as plastic (for example, polyacetal resin). The sun gear 3, the planetary gear 4, the fixed internal gear 5, and the movable internal gear 6 constitute one paradox planetary gear mechanism. The paradox planetary gear mechanism will be described below in detail.

Figure 3:
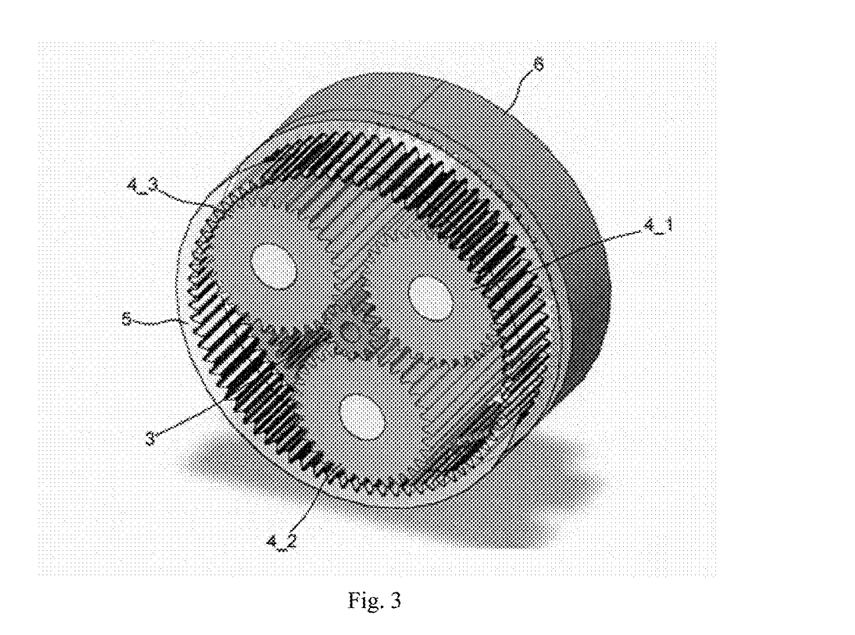
FIG. 3 is a perspective view illustrating a structure of a paradox planetary gear mechanism including a sun gear, a planetary gear, a fixed internal gear, and a movable internal gear.

FIG. 3 is a perspective view illustrating a structure of the paradox planetary gear mechanism including the sun gear 3, the planetary gear 4, the fixed internal gear 5, and the movable internal gear 6.

As illustrated in FIG. 3, the planetary gears 4_1 to 4_3 are disposed in engagement with the sun gear 3 disposed at a central portion of the paradox planetary gear mechanism. In addition, the fixed internal gear 5 configured to engage part of the areas of the planetary gear 4 and configured to guide the rotation of the planetary gears 4_1 to 4_3 is fixedly disposed in the periphery of the planetary gears 4_1 to 4_3, and the movable internal gear 6 that engages other areas of the planetary gear 4 and is configured to be rotatable is also disposed therein.

In the paradox planetary gear mechanism described above, the sun gear 3 rotates upon reception of a rotational force from a rotation shaft of the drive motor 2, which in turn causes the planetary gears 4_1 to 4_3 to rotate (revolve) along the fixed internal gear 5 while rotating. The movable internal gear 6 rotates upon reception of the rotational force of the planetary gears 4_1 to 4_3. The output shaft 7 can be rotated by a significantly reduced rotational force of the drive motor 2 by coupling the output shaft 7 (valve stem) to the movable internal gear 6.

Since the paradox planetary gear mechanism described above has a self-lock function, even though a force is applied externally to the output shaft 7 (valve stem) which is coupled to the movable internal gear 6, the output shaft 7 cannot be rotated, or requires a large force to rotate. Therefore, even when the power supply to the drive motor 2 is interrupted due to an interruption of electric service, the valve opening of the regulating valve may be substantially fixed, so that the self-lock function of the regulating valve may be realized.

As described above, the self-lock function of the regulating valve is realized by the paradox planetary gear mechanism that includes the sun gear 3, the planetary gear 4, the fixed internal gear 5, and the movable internal gear 6.

In addition, the paradox planetary gear mechanism described above has a structure that rotates the movable internal gear 6 not only by the drive motor 2, but manually. The structure of the paradox planetary gear mechanism will be described below in detail.

As illustrated in FIG. 1, the manual operating gear 9 includes a gear portion 9a and a supporting portion 9b.

The gear portion 9a has, for example, the same diameter and the same number of teeth as the sun gear 3 and is disposed on the same axis as the sun gear 3 so as to engage each of the second gear portions 42 of the planetary gears 4_1 to 4_3.

The supporting portion 9b supports the gear portion 9a, and is inserted into a through-hole 6c of the movable internal gear 6. The supporting portion 9b is integrally formed with the gear portion 9a, for example. Specifically, the supporting portion 9b is accommodated in the through-hole 6c of the movable internal gear 6, and partly projects to the outside of the housing 1 together with the movable internal gear 6. The supporting portion 9b is formed into a cylindrical shape opening at one end thereof and bottomed on the other end. Specifically, an end portion of the supporting portion 9b on the side projecting from the housing 1 is provided with a hole 9c formed in the direction of an axis of rotation of the gear portion 9a.

A projection 8a of the dial 8 is inserted into the hole 9c, and the projection 8a of the dial 8 fits into the hole 9c. Accordingly, the manual operating gear 9 and the dial 8 are coupled.

Here, the hole 9c and the projection 8a of the dial 8 are formed into, for example, a polygonal shape (for example, a hexagonal shape) in plan view.

Since the manual operating gear 9 and the dial 8 are coupled as described above, a rotational force can be applied directly to the planetary gear 4 not by the drive motor 2 and the sun gear 3, but by rotating the dial 8 manually, for example. Accordingly, even in a state in which the drive motor 2 is stopped, the movable internal gear 6 can be rotated via the planetary gear 4 by operating the dial 8 manually and rotating the manual operating gear 9, and thus the valve stem may be rotated to a position that achieves a desired valve opening. As described above, since the paradox planetary gear mechanism is employed as the power transmitting mechanism of the setting/operating device 100, the valve stem can be fixed at the position described above by the self-lock function of the paradox planetary gear mechanism after the valve stem is rotated to a desired position by the dial 8.

Subsequently, the position where the dial 8 is formed will be described.

Figure 4:
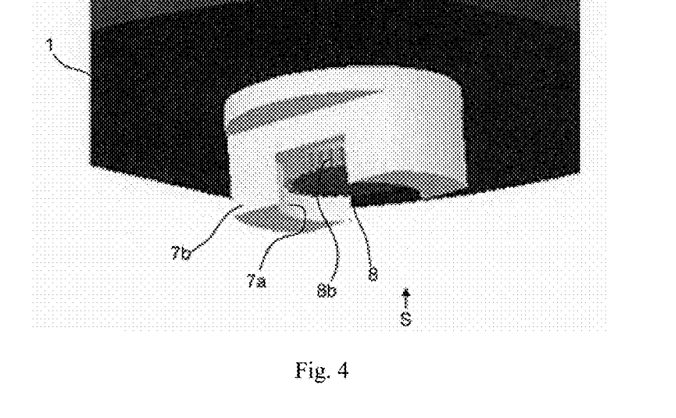
FIG. 4 is a perspective view illustrating a peripheral portion of a dial in the setting/operating device according to Embodiment 1 in an enlarged scale.

FIG. 4 is a perspective view illustrating a peripheral portion of a dial 8 in the setting/operating device 100 according to Embodiment 1 in an enlarged scale.

Figure 5:
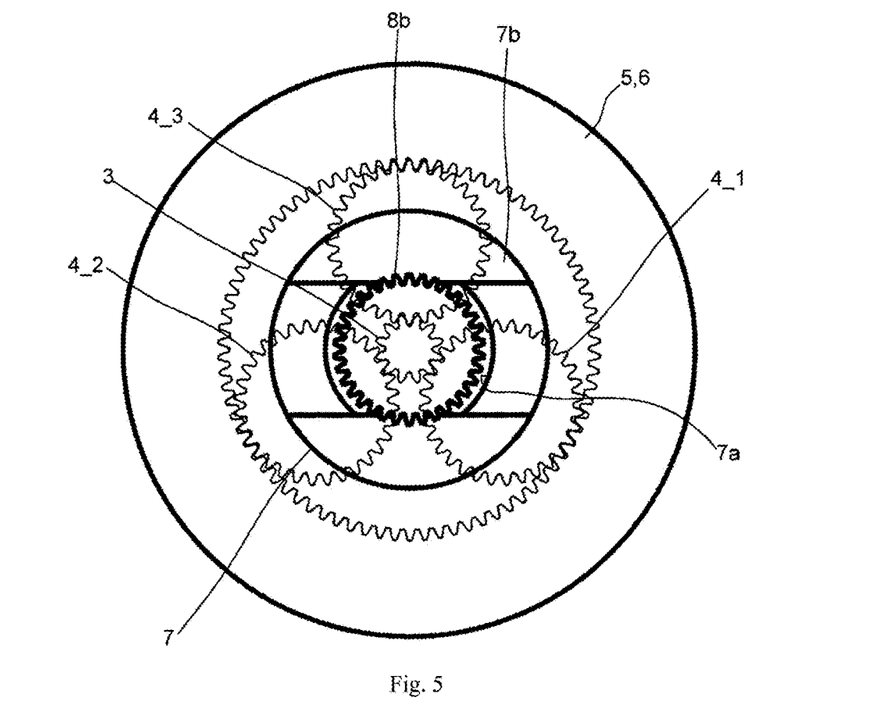
FIG. 5 is a plan view illustrating the setting/operating device according to Embodiment 1 when viewed from a valve stem side.

FIG. 5 is a plan view illustrating the setting/operating device 100 according to Embodiment 1 viewed from the valve stem side (or direction S as shown in FIG. 1).

As illustrated in FIGS. 4 and 5, the output shaft 7 is formed into a rod shape (for example, cylindrical shape), and includes a cut-away portion 7*b* which is formed by cutting away part of an outer peripheral portion of the output shaft 7 in a radial direction and a concave portion 7*a* formed at a central portion of the output shaft 7 in the radial direction. And as shown in FIGS. 4 and 5, output shaft 7 may comprise two opposing cut-away portions 7*b* (on opposite sides of output shaft 7) and corresponding two opposing concave portions 7*a* (on corresponding opposite sides of output shaft 7).

The dial 8 is disposed at the concave portion 7*a* of the output shaft 7. Specifically, as illustrated in FIG. 5, the dial 8 is disposed in such a manner that the center of the dial 8 is aligned with the center of the concave portion 7*a* in plan view, and part of an outer peripheral portion 8*b* of the dial 8 protrudes from the concave portion 7*a* toward the cut-away portion 7*b* in plan view.

With the output shaft 7 formed and the dial 8 disposed in the manner described above, even when the dial 8 is disposed coaxially with the sun gear 3 as illustrated in FIGS. 1 to 5, the output shaft 7 does not become an impediment to the operation of the dial 8, and thus manual operation of the valve stem can easily be performed.

Subsequently, the elastically deformable portion 43 of the planetary gear 4 will be described in detail.

As described above, the planetary gears 4_1 to 4_3 each have the elastically deformable portion 43.

Figure 6:
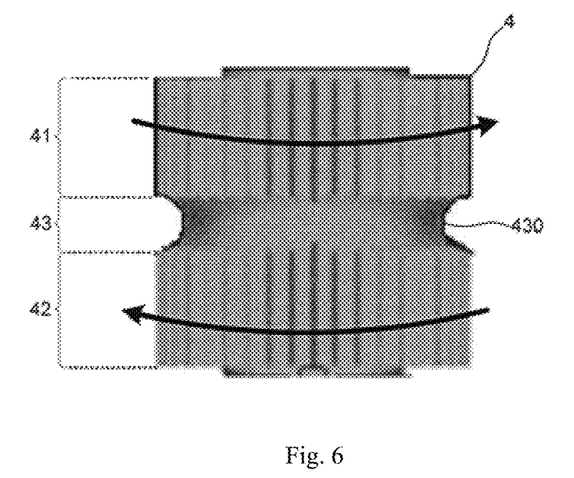
FIG. 6 is a view schematically illustrating a structure of an elastically deformable portion of the planetary gear in the setting/operating device according to Embodiment 1.

FIG. 6 is a view schematically illustrating a structure of the elastically deformable portion 43 of the planetary gear 4 in the setting/operating device according to Embodiment 1.

As illustrated in FIG. 6, the elastically deformable portion 43 may be realized by a groove 430 formed on, for example, an outer peripheral portion of the planetary gear 4 between the first gear portion 41 and the second gear portion 42 in a radial direction of the planetary gear 4 (a direction perpendicular to the axis of rotation of the planetary gear 4).

Here, the shape of the groove 430 that constitutes the elastically deformable portion 43 is not specifically limited. However, the groove 430 having an arcuate shape as illustrated in FIGS. 1 and 6 may be formed by easy process treatment.

The elastically deformable portion 43 may be formed on the outer peripheral portion between the first gear portion 41 and the second gear portion 42, and preferably, at a position which makes the length of the first gear portion 41 and a length of the second gear portion 42 in the direction of the axis of rotation of the planetary gear 4 equal.

As described above, with the elastically deformable portion 43 (groove 430) formed on the outer peripheral portion of the planetary gear 4 between the first gear portion 41 and the second gear portion 42, the planetary gear 4 is elastically deformable more easily with respect to the twisting motion at the elastically deformable portion 43 than the first gear portion 41 and the second gear portion 42.

For example, a case where vibrations occurs due to an irregular flow such as pulsation of a fluid in a pipe that is connected to the regulating valve will be considered. In this case, due to the vibrations described above, the valve member (valve plug) of the regulating valve is abruptly moved, and thus an impact force is applied to the valve stem. Accordingly, the impact force may in turn be applied from the valve stem to the fixed internal gear 5, the movable internal gear 6, and the planetary gear 4 of the setting/operating device 100 via the output shaft 7 due to a self-lock function of the paradox planetary gear mechanism. At this time, as illustrated in FIG. 6, the first gear portion 41 engaging the fixed internal gear side and the second gear portion 42 engaging the movable internal gear 6 of the planetary gear 4 are subjected to forces in directions opposite to each other. In other words, the planetary gear 4 is subjected to a twisting force.

Therefore, with the provision of the elastically deformable portion 43 (groove) between the first gear portion 41 and the second gear portion 42 as described above, the planetary gear 4 may be resiliently deformed intentionally at the corresponding portion to absorb the impact force. Accordingly, the impact force applied to the fixed internal gear 5, the movable internal gear 6, and the planetary gear 4 of the setting/operating device 100 may be alleviated, so that the damage of the teeth of the respective gears may be prevented.

In the same manner, for example, even in the case where an excessive torque increase occurs abruptly due to foreign substances or the like caught by the regulating valve during driving of the regulating valve, the elastically deformable portion 43 of the planetary gear 4 may absorb the amount of impact caused by the torque increase, so that damage of the gears may be prevented.

The invention has been described with the case where the elastically deformable portion 43 of the planetary gear 4 is formed separately from the first gear portion 41 and the second gear portion 42. However, the invention is not limited thereto, and the planetary gear 4 may be configured to be elastically deformable entirely.

As described thus far, according to the setting/operating device 100 of Embodiment 1, the paradox planetary gear mechanism is employed as the power transmitting mechanism, and the manually operating means configured to apply the force applied externally to the sun gear 3 of the paradox planetary gear mechanism as a rotational force is provided. Therefore, the dial 8 may be manually operated to rotate the movable internal gear 6 even in a state in which the drive motor 2 is stopped due to the reason such as an interruption of electric service, for example. Also, since the structure of the Embodiment 1 does not have a structure in which the self-lock function of the paradox planetary gear mechanism is released as in the related art described above, the valve stem may be fixed after the operation of the dial 8. In other words, according to the setting/operating device 100 of Embodiment 1, the manual operation of the valve stem is enabled while realizing the self-lock function of the regulating valve.

According to the setting/operating device 100 of Embodiment 1, with the provision of the elastically deformable portion 43 on the planetary gear 4, even when an impact force is applied from the valve stem side of the regulating valve, the impact force may be absorbed by the elastically deformable portion 43 formed on the planetary gear 4 between the first gear portion 41 and the second gear portion 42 which constitute the paradox planetary gear mechanism.

Therefore, damage to the respective gears that constitute the paradox planetary gear mechanism may be prevented.

The setting/operating device 100 of Embodiment 1 does not have a structure in which an impact force is absorbed by using an additional elastic member, where the fixed internal gear is rotationally fixed with the elastic member, as disclosed in PTL 2 described above. Therefore, the fixed internal gear 5 may, for example, be integrated with housing 1 and plate 5a and, in addition, the elastic member does not have to be provided. And, thus, an increase in the number of components is prevented.

In other words, according to the setting/operating device 100 of Embodiment 1, the setting/operating device in which damage to the gears is reduced while preventing the increase in number of components is achieved.

Since the elastically deformable portion 43 is composed of a groove formed on the outer peripheral portion of the planetary gear 4, the elastically deformable portion 43 may be formed easily by applying, for example, a simple process treatment on the planetary gear 4 of the related art, and thus an increase in manufacturing cost caused by adding the elastically deformable portion 43 may be restrained. In addition, as described above, by integrally forming the plate 5a and the gear portion 5b as the fixed internal gear 5, further reduction of the manufacturing cost is enabled.

«Embodiment 2»

Another embodiment of the elastically deformable portion of the planetary gear will be described below.

Figure 7:
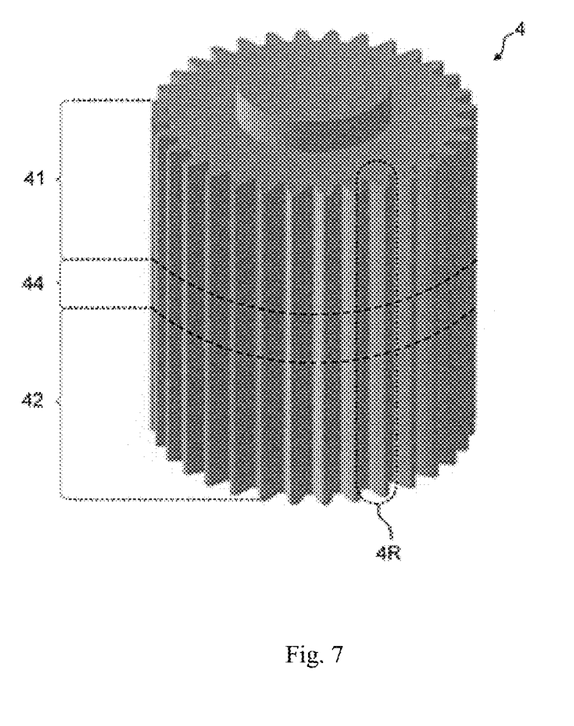
FIG. 7 is a perspective view schematically illustrating a structure of a planetary gear in a setting/operating device according to Embodiment 2.

FIG. 7 is a perspective view schematically illustrating a structure of the planetary gear in a setting/operating device according to Embodiment 2.

Figure 8:
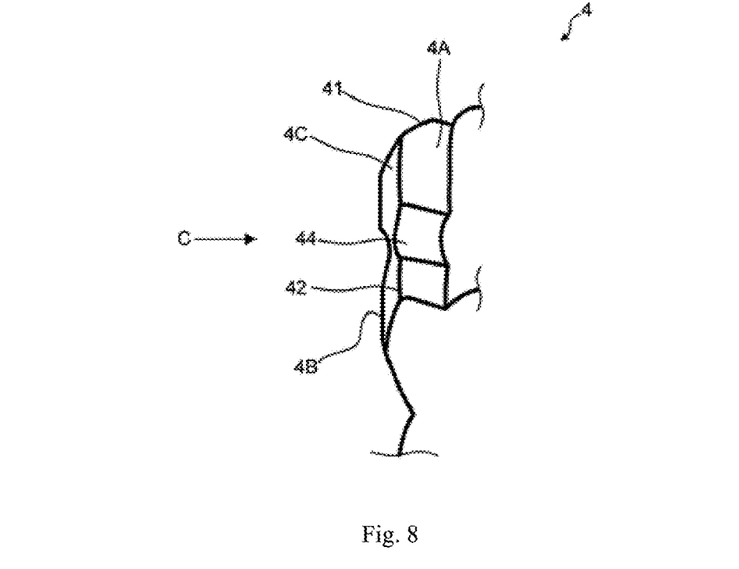
FIG. 8 is a perspective view schematically illustrating a structure of teeth of the planetary gear in the setting/operating device according to Embodiment 2.

FIG. 8 is a perspective view schematically illustrating a structure of teeth of the planetary gear in the setting/operating device according to Embodiment 2. FIG. 8 illustrates a drawing of one tooth of the planetary gear 4 in FIG. 7 surrounded by the reference sign 4R in an enlarged scale.

The elastically deformable portion 44 of the planetary gear 4 of the setting/operating device according to Embodiment 2 has a tooth thickness smaller than the first gear portion 41 and the second gear portion 42 of the planetary gear 4. Specifically, as illustrated in FIG. 8, the elastically deformable portion 44 is realized by reducing the tooth thickness of part of each tooth which constitutes the planetary gear 4 (the thickness of the tooth in the circumferential direction) with respect to other portions of the tooth.

Figure 9:
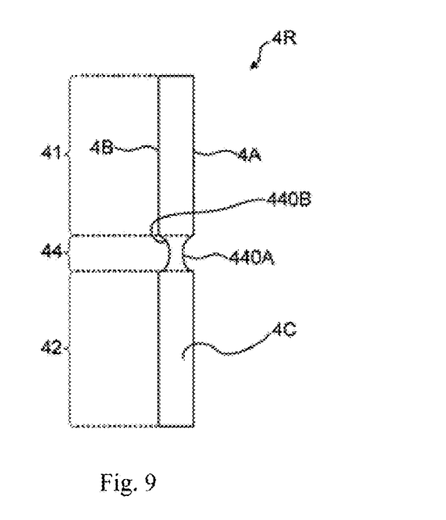
FIG. 9 is a plan view schematically illustrating a structure of the teeth of the planetary gear in the setting/operating device according to Embodiment 2.

FIG. 9 is a plan view schematically illustrating a structure of the teeth of the planetary gear in the setting/operating device according to Embodiment 2. In FIG. 9, a configuration of the one tooth which constitutes the planetary gear 4 when viewed in a direction C in FIG. 8 is illustrated (i.e., viewed inward in the radial direction towards the planetary gear 4 and surface 4C thereof).

As illustrated in FIG. 9, the elastically deformable portion 44 having a tooth thickness smaller than those of the first gear portion 41 and the second gear portion 42 is formed by forming grooves 440A, 440B at positions opposing to each other on a front surface 4A on the tooth circumferential direction and a surface 4B on the back side thereof.

In this configuration, even when the impact force of the regulating valve is applied from the valve stem side, the planetary gear 4 can be elastically deformed more easily by a twisting motion at the elastically deformable portion 44 than the first gear portion 41 and the second gear portion 42, so that the impact force described above can be absorbed.

According to the setting/operating device of Embodiment 2, the impact force applied to the fixed internal gear 5, the movable internal gear 6, and the planetary gear 4 of the setting/operating device may be alleviated by the elastically deformable portion 44 formed between the first gear portion 41 and the second gear portion 42 in the same manner as the setting/operating device of Embodiment 1, so that damage to the teeth of the respective gears may be prevented.

«Embodiment 3»

In Embodiments 1 and 2, the cases where the elastically deformable portions 43, 44 are formed between the first gear portion 41 and the second gear portion 42 by changing the shape of the planetary gear 4 have been described. However, the elastically deformable portion may be configured without changing the shape of the gear.

Figure 10:
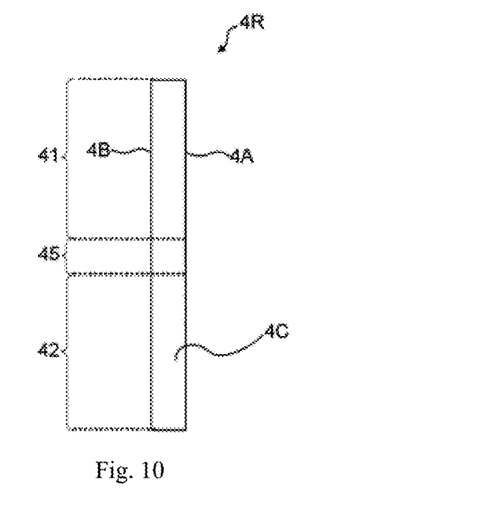
FIG. 10 is a plan view schematically illustrating a structure of teeth of a planetary gear in a setting/operating device according to Embodiment 3.

FIG. 10 is a plan view schematically illustrating a structure of teeth of the planetary gear in a setting/operating device according to Embodiment 3.

As illustrated in FIG. 10, an area 45 between the first gear portion 41 and the second gear portion 42 of the tooth which constitutes the planetary gear 4 is formed of a material having an elastic modulus smaller than the material that forms the first gear portion 41 and the second gear portion. For example, the above-described area is formed by a material lower (lower in Young's modulus) in coefficient of elasticity than that forming the first gear portion 41 and the second gear portion 42.

For example, in the case where the planetary gear 4 is formed of a resin, the first gear portion 41 and the second gear portion 42 are formed of a polyacetal resin containing glass, and the elastically deformable portion 45 is formed of a polyacetal resin. Accordingly, the coefficient of elasticity of first gear portion 41 and the second gear portion 42 may be differentiated from the elastically deformable portion 45.

In this configuration, even when the impact force of the regulating valve is applied from the valve stem side, the planetary gear 4 can be elastically deformed more easily by a twisting motion at the elastically deformable portion 45 than the first gear portion 41 and the second gear portion 42, so that the impact force described above can be absorbed.

According to the setting/operating device of Embodiment 3, the impact force applied to the fixed internal gear 5, the movable internal gear 6, and the planetary gear 4 of the setting/operating device may be alleviated at the elastically deformable portion 45 by providing a difference in the coefficient of elasticity by differentiating the materials of the first gear portion 41 and the second gear portion 42 from that of the elastically deformable portion 45 in the same manner as Embodiments described above, so that damage to the teeth of the respective gears may be prevented.

As described above, the invention implemented by the inventors has been described specifically based on the embodiments. However, the invention is not limited thereto, and it is needless to say that the invention can be modified in various ways without departing from the scope thereof.

For example, although the case where the manual operating gear 9 is disposed coaxially with the sun gear 3 as the method of manually operating the paradox planetary gear mechanism has been described in Embodiments described above, the invention is not limited thereto.

Figure 11:
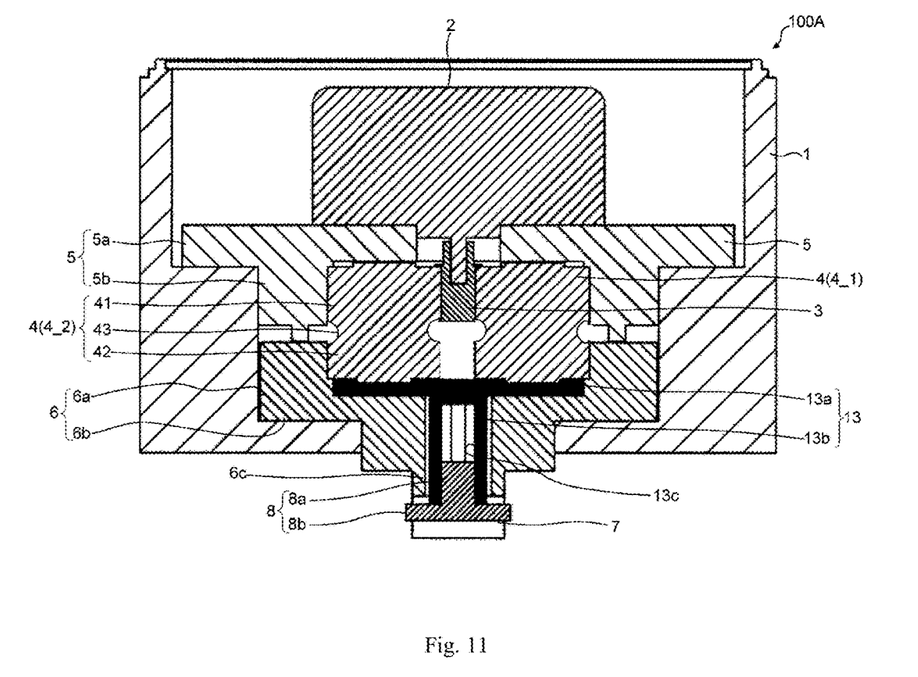
FIG. 11 is a cross-sectional view illustrating a principal portion of another setting/operating device according to an Embodiment of the invention.

For example, as a setting/operating device 100A illustrated in FIG. 11, a configuration (with an alternative manual operation mechanism) in which the planetary gears 4_1 to 4_3 are placed on a carrier 13, and the movable internal gear 6 is rotated via the planetary gear 4 by manually operating the dial 8 coupled to the carrier 13 is also applicable.

More specifically, as illustrated in FIG. 11, the carrier 13 including a seat 13a that is placed on the movable internal gear 6 and supports the planetary gear 4 and rotates on the movable internal gear 6 and a supporting portion 13b that supports the seat 13a and inserted into a through-hole 6c of the movable internal gear 6 is provided instead of the manual operating gear 9. Here, projections are formed on the surface of the seat 13a of the carrier 13, and the projections are inserted into the through-holes formed at a central portions (rotation shafts) of the respective planetary gears 4_1 to 4_3, so that each of the planetary gears 4_1 to 4_3 is rotatably supported. In addition, a hole 13c having a polygonal shape (hexagonal shape) in plan view opening toward the rotation shaft of the sun gear 3 is formed at an end portion of the supporting portion 13b of the carrier 13 protruding from the housing 1, and a projection 8a of the dial 8 is fitted into the hole 13c.

Accordingly, in the same manner as the case where the manual operating gear 9 described in Embodiment 1 is used, even in a state in which the drive motor 2 is stopped, the movable internal gear 6 can be rotated by operating the dial 8 manually, and therefore the valve stem can be rotated to a position that achieves a desired valve opening.

Although the case where the dial 8 as one of the manually operating means is coupled to the manual operating gear 9 or the carrier 13 by a separate component has been exemplified in the embodiment described above, the invention is not limited thereto, and a configuration in which the dial 8 may be integrally formed with the manual operating gear 9 or the carrier 13 may be used.

Although the case in which the movable internal gear 6 and the output shaft 7 are formed integrally has been exemplified in Embodiments described above, the invention is not limited thereto, and a configuration in which these components may be formed as separate components and coupled to have the same axis of rotation may be used.

DESCRIPTION OF REFERENCE NUMERALS AND SIGNS 100, 100A . . . setting/operating device, 1 . . . housing, 2 . . . drive motor, 3 . . . sun gear, 4_1, 4_2, 4_3, 4 . . . planetary gear, 5 . . . fixed internal gear, 5a . . . plate, 5b . . . gear portion, 6 . . . movable internal gear, 6a . . . gear portion, 6b . . . bottom portion, 6c . . . through-hole, 7 . . . output shaft, 7a . . . concave portion, 7b . . . cut-away portion, 8 . . . dial, 8a . . . projection, 8b . . . outer peripheral portion, 9 . . . manual operating gear, 9a . . . gear portion, 9b . . . supporting portion, 9c . . . hole, 41 . . . first gear portion, 42 . . . second gear portion, 43, 44, 45 . . . elastically deformable portion, 4A, 4B, 4C . . . surface of tooth, 13 . . . carrier, 13a . . . seat, 13b . . . supporting portion, 430, 440A, 440B . . . groove

The invention claimed is:

1. A setting/operating device comprising:
   a sun gear configured to rotate upon reception of a rotational force from a drive motor;
   a fixed internal gear fixedly disposed in a form of surrounding the sun gear and having teeth on a fixed inner peripheral surface thereof;
   a plurality of planetary gears disposed between the sun gear and the fixed internal gear and rotatable in engagement with the sun gear and the fixed internal gear while revolving around the sun gear;
   a movable internal gear disposed coaxially with the fixed internal gear, having teeth on a movable inner peripheral surface that come into engagement with the planetary gears, said movable internal gear being configured to be rotatable;
   an output shaft coupled to the movable internal gear and configured to rotate a valve stem of a regulating valve;
   wherein the planetary gears each comprise:
      a plurality of external gear teeth extending from one end to another end;
      a first portion where the external gear teeth have a first thickness and engage the sun gear and the fixed internal gear,
      a second portion disposed coaxially with the first portion where the external gear teeth have the first thickness and engage the movable internal gear; and
      a third portion disposed between the first and second portions where at least one of the external gear teeth has a second thickness smaller than the first thickness.

2. The setting/operating device according to claim 1, wherein the third portion is formed of a material having a smaller elastic modulus than another material forming the first portion and the second portion.

3. A setting/operating device comprising:
   a sun gear configured to rotate upon reception of a rotational force from a drive motor;
   a fixed internal gear fixedly disposed in a form of surrounding the sun gear and having teeth on a fixed inner peripheral surface thereof;
   a plurality of planetary gears disposed between the sun gear and the fixed internal gear and rotatable in engagement with the sun gear and the fixed internal gear while revolving around the sun gear;
   a movable internal gear disposed coaxially with the fixed internal gear, having teeth on a movable inner peripheral surface that come into engagement with the planetary gears, said movable internal gear being configured to be rotatable;
   an output shaft coupled to the movable internal gear and configured to rotate a valve stem of a regulating valve;
   wherein the planetary gears each comprise:
      a first gear portion formed of a first material that engages the sun gear and the fixed internal gear,
      a second gear portion formed of the first material disposed coaxially with the first gear portion and that engages the movable internal gear; and
      a third portion coupling the first and second gear portions, the third portion being formed of a second material having a smaller elastic modulus than the first material.

* * * * *